United States Patent [19]

Steigleder

[11] Patent Number: 4,894,142
[45] Date of Patent: Jan. 16, 1990

[54] HYDROCRACKING PROCESS EMPLOYING LOW ACIDITY Y ZEOLITE

[75] Inventor: Karl Z. Steigleder, Glen Ellyn, Ill.

[73] Assignee: UOP, Des Plaines, Ill.

[21] Appl. No.: 316,723

[22] Filed: Feb. 28, 1989

Related U.S. Application Data

[63] Continuation-in-part of Ser. No. 29,938, Mar. 24, 1987, abandoned, which is a continuation-in-part of Ser. No. 781,562, Sep. 9, 1985, abandoned.

[51] Int. Cl.$^4$ ................ C10G 23/00; C10G 47/20
[52] U.S. Cl. .................. 208/111; 208/112; 208/143; 502/63; 502/85; 502/65
[58] Field of Search ............ 208/111, 143, 112; 502/85, 63, 65

[56] References Cited

U.S. PATENT DOCUMENTS

| | | | |
|---|---|---|---|
| 3,354,077 | 11/1967 | Hunsford | 208/111 |
| 3,781,199 | 12/1973 | Ward | 208/111 |
| 3,853,742 | 12/1974 | Ward | 208/111 |
| 3,853,747 | 12/1974 | Young | 208/111 |
| 3,897,327 | 7/1975 | Ward | 208/111 |
| 3,929,672 | 12/1975 | Ward | 252/455 Z |
| 4,110,199 | 8/1978 | Flagg et al. | 208/111 |
| 4,139,433 | 2/1979 | Ward | 208/111 |
| 4,263,129 | 4/1981 | Chen et al. | 208/120 |
| 4,284,529 | 8/1981 | Shibabi | 208/111 |
| 4,401,556 | 8/1983 | Bezman et al. | 208/111 |
| 4,419,271 | 12/1983 | Ward | 502/65 |
| 4,429,053 | 1/1984 | Ward | 502/65 |
| 4,434,046 | 2/1984 | Audeh | 208/111 |
| 4,439,310 | 3/1984 | Audeh et al. | 208/120 |
| 4,517,073 | 5/1985 | Ward et al. | 208/111 |
| 4,555,495 | 11/1985 | Krishnamurthy | 502/50 |
| 4,565,621 | 1/1986 | Ward | 208/111 |
| 4,604,187 | 8/1986 | Ward | 208/111 |
| 4,661,239 | 4/1987 | Steigleder | 208/111 |
| 4,738,766 | 4/1988 | Fischer et al. | 208/111 |
| 4,790,928 | 12/1988 | Chang et al. | 208/111 |

OTHER PUBLICATIONS

Pp. 140–147 of American Chemical Society Monograph 171, Jule A. Rabo, editor.

Primary Examiner—Helane Myers
Attorney, Agent, or Firm—Thomas K. McBride; John F. Spears, Jr.

[57] ABSTRACT

A highly selective hydrocracking process providing increased yields of middle distillates is disclosed. The process employs a catalyst comprising a Y-type hydrogen form zeolite having a unit cell size between about 24.20 Angstroms and 24.40 Angstroms, a metal hydrogenation component and refractory oxide support materials. The catalyst is characterized by low ammonia temperature programmed desorption (TPD) acidity strength values. This may be achieved by dehydroxylation caused by a dry calcination.

19 Claims, No Drawings

HYDROCRACKING PROCESS EMPLOYING LOW ACIDITY Y ZEOLITE

CROSS-REFERENCE TO RELATED APPLICATION

This application is a continuation-in-part of my prior application Ser. No. 07/29,938 filed Mar. 24, 1987, now abandoned which is a continuation-in-part application of my prior application Ser. No. 781,562 filed September 9, 1985 (now abandoned).

FIELD OF THE INVENTION

The present invention relates to a highly selective mid-barrel or distillate hydrocracking process. More particularly, the invention relates to a hydrocracking process which is very selective in converting heavy hydrocarbon oils to middle distillates boiling in the 300° F. to 700° F. (149–371° C.) range. The invention is characterized by the use of a novel low acidity strength Y zeolite.

BACKGROUND OF THE INVENTION

Hydrocracking is a petroleum refining process wherein the molecules of a hydrocarbonaceous material are partially decomposed in the presence of hydrogen to obtain a more desirable lower molecular weight hydrocarbon product. As a result of the increased demand for middle distillates such as jet and diesel fuels, commercial interest in hydrocracking has intensified because the process degrades less of the feedstock to gas and coke and thereby yield, a greater proportion of middle distillate boiling range liquid products than thermal or nonhydrogen consuming craking processes.

A crucial element of a competitive hydrocracking process is the use of a special catalyst that is highly active for both cracking and hydrogenation. A great number of these bifunctional catalysts are well known in the prior art. In general, cracking activity, i.e., a measure of the conversion of feedstock to product, is most often attributed to solid acid components present in the catalytic base. Hydrogenation activity, on the other hand, is usually credited to the various metals deposited on the catalyst base. These metals are most often selected from Groups VIB and VIII of the Periodic Table of Elements.

Popular catalysts employed in the hydrocracking industry for middle distillate production comprise a metal(s) and/or metal compounds selected from Group VIB or Group VIII of the Periodic Table deposited on an amorphous refractory inorganic oxide base material such as mixtures of silica-alumina and alumina. Recently significant commercial activity has been directed toward developing hydrocracking catalysts which comprise crystalline aluminosilicates in the catalyst base.

Generally, zeolitic aluminosilicates possess greater total acidity than amorphous oxides and therefore exhibit higher cracking activity. Because of this characteristic, zeolites are believed to impart a superior catalytic effect on hydrocarbon conversion. Research in the development of zeolitic hydrocracking catalysts has given special attention to the Y-type zeolite originally disclosed in U.S. Pat. No. 3,130,007. The catalytic mechanism of the Y-type zeolite is not fully understood. It has been observed, however, that a hydrocracking catalyst comprising zeolite Y not only exhibits increased activity for middle distillate production, but also better selectivity for the desired product middle distillate.

PRIOR ART

State of the art zeolite containing hydrocracking catalysts comprise zeolite Y or various modifications of zeolite Y in a refractory inorganic oxide matrix. Zeolite Y can be modified for example by increasing the molar ratio of silica to alumina and reducing the unit cell size.

U.S. Pat. No. 4,419,271 issued to J.W. Ward discloses a hydrocarbon conversion catalyst useful for hydrocracking comprising one or more hydrogenation components supported on a base containing a crystalline aluminosilicate zeolite having activity for cracking hydrocarbons and a dispersion of silica-alumina in an alumina matrix. The patentee teaches that the replacement of alkali metals with multivalent metal-containing cations, hydrogen ions or hydrogen ion precursors, generally accomplished by ion exchange, is necessary to produce a zeolite having a desired cracking activity. Reducing the alkali metal content to less than 5 wt. % and preferably less than 0.5 wt. % (calculated as the alkali metal oxides) results in a material having substantial cracking activity. The most highly preferred zeolite taught by patentee for use as a component in a hydrocracking catalyst composition is a modified Y-zeolite having a silica to alumina ratio between about 3.5 and 6.0, a surface area between about 500 and 700 m$^2$/g, a unit cell size between about 24.25 and 24.35 Angstroms, water adsorption capacity less than about 8% by weight of the zeolite (at 4.6 mm partial pressure of water vapor and 25° C.), and an ion-exchange capacity less than 20% of that of a sodium Y zeolite of comparable silica to alumina ratio.

U.S. Pat. No. 4,401,556 issued to R.D. Bezman and J.A. Rabo discloses a hydrocarbon conversion catalyst comprising an ultrahydrophobic zeolite Y (UHP-Y) characterized by having a silica to alumina molar ratio of from 4.5 to 35, the essential X-ray powder diffraction pattern of zeolite Y, an ion exchange capacity of not greater than 0.070, a unit cell dimension of from 24.20 to 24.45 Angstroms, a surface area of at least 350 m$^2$/g (B-E-T), a sorptive capacity for water vapor at 25° and a p/p° value of 0.10 of less than 5.00 weight percent, and a Residual Butanol Test value of not more than 0.40 weight percent.

U.S. Pat. No. 4,517,073 also issued to J.W. Ward discloses a hydrocracking catalyst comprising an active hydrogenation component on a support comprising a dispersion of silica-alumina in alumina and a Y-type zeolite having a silica to alumina molar ratio above about 6.0. The zeolites used in the catalysts contemplated in patentee's hydrocracking process possess the essential crystal structure of Y-zeolite, contain alkali metals less than 1.5 percent by weight (calculated as total metal monoxides) and have a unit cell size typically at or less than 24.65 Angstroms. Preferred silica to alumina molar ratios are between 6 and 20 and when the molar ratio is below 20, patentee's contemplated zeolites have an adsorption capacity for water vapor at 25° and 4.6 mm Hg water vapor partial pressure of at least 20 weight percent based on the anhydrous weight of the zeolite and preferably an oxygen adsorption capacity at 100 mm Hg and −183° of at least 25 weight percent.

The above patents are believed illustrative of the state of the art hydrocracking catalysts comprising Y-type zeolites. The Y-type zeolites taught by the prior art for use in hydrocracking have been characterized in such terms as the molar ratio of silica to alumina, unit cell dimension, ion exchange capacity, surface area, and sorptive capacity for water. Bifunctional catalysts employed in hydrocracking provide both cracking and hydrogenation activity, and it is well known in the art that the acidity of a catalyst component will affect the catalyst cracking activity. For instance, the papers by Dwyer and Newsam cited below discuss the cause and influence of the acidity of zeolites. Yet, in spite of the tremendous effort put forth by skilled researchers in the field of hydrocracking, the effect of hydroxyl concentration, which relates directly to acidity strength of a cracking component (such as Y-type zeolite), on selectivity has been virtually disregarded.

There is in general scant discussion of dehydroxylation in the literature. One exception to this is the family of references including U.S. Pat. No. 4,790,928 issued to C.D. Chang et al. This reference relates improving the performance of ZSM-5 and other intermediate pore size zeolites by selective dehydroxylation. The resultant zeolite, when compounded into a catalyst, is taught to be useful for the catalytic dewaxing of petroleum fractions such as reduced crudes or vacuum gas oil. The dehydroxylation is caused by calcination above 600° C. (1172° F.) in the absence of water.

At pages 140–147 of *American Chemical Society Monograph* 171, Jule A. Rabo editor, there is a discussion of studies of the hydroxyl group content of Y zeolites and the effects of calcination.

The use of low acidity catalysts for hydrocracking is discussed in U.S. Pat. No. 4,263,129 issued to N.Y. Chen et al. That reference is, however, believed to be limited to using a zeolite such as ZSM-5 having a silica to alumina ratio above 12. Preferably the low acidity is obtained with extensive ion exchange of the zeolite with sodium or other alkali metal to give high sodium contents, although steaming to reduce acidity is referred to. The subject process is distinguished from this reference by the use of low sodium content, low silica to alumina ratio Y zeolites.

U.S. Pat. No. 3,929,672 issued to J.W. Ward compares the effect on Y zeolites of steam and dry calcinations. Dry calcinations are indicated to result in a loss of crystallinity.

SUMMARY OF THE INVENTION

The present invention in its broadest terms provides a middle distillate selective hydrocracking process using a catalyst comprising a hydrogen form crystalline Y-type zeolite having a unit cell size between about 24.20 and 24.40 Angstroms, with the zeolite having a sufficiently low level of surface hydroxyl groups to result in an $NH_3$-TPD acidity strength value of less than about 2.00. The zeolite is preferably dehydroxylated by dry calcination.

The invention may be characterized as a hydrocracking process selective for midbarrel distillate production which comprises passing a hydrocarbon feed stream containing at least 50 volume % of components boiling above 371° C. into contact with a catalyst composition comprising in admixture: (i) a hydrogenation component, (ii) a refractory inorganic oxide matrix comprising alumina, and (iii) a crystalline hydrogen form Y-type aluminosilicate zeolite having a unit cell size between about 24.20 Angstroms and 24.40 Angstroms and a $NH_3$-TPD acidity strength value of less than about 1.50 while maintaining the catalyst at hydrocracking conditions, and recovering a product stream.

DETAILED DESCRIPTION OF THE INVENTION

It is an object of this invention to provide improved hydrocracking catalysts and processes. It is a further object of this invention to provide an improved hydrocracking catalyst which exhibits increased activity and selectivity for a middle distillate product.

It has now been discovered that a hydrogen form Y-type zeolite having a low concentration of bound hydroxyl groups on the surface of the zeolite provides a superior hydrocracking catalyst. It has been found that this catalyst, which may be characterized by ammonia temperature programmed desorption ($NH_3$-TPD), is more highly selective in a middle distillate producing hydrocracking process.

The hydrocracking composition of the present invention comprises a crystalline Y-type zeolite. The Y-type zeolite is generally disclosed in U.S. Pat. No. 3,130,007, which is incorporated herein by reference.

The chemical formula for zeolite Y expressed in terms of moles of oxides may be written as

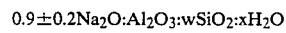

$$0.9 \pm 0.2 Na_2O:Al_2O_3:wSiO_2:xH_2O$$

wherein w is a value from 3 to about 6 and x may be a value up to about 9.

The classical structure of zeolite Y is threedimensional frameworks of $SiO_4$ and $AlO_4$ tetrahedra crosslinked by the sharing of oxygen atoms. The electrovalence of the tetrahedra containing aluminum is balanced by the presence of cations such as metal ions, rare earth metal ions, alkali metal ions, ammonium ions, amine complexes and hydrogen ions. The void spaces in the framework may be occupied by water molecules. Normally, the crystalline zeolite occurs or is prepared in the alkali metal form. The classification of a material as zeolite Y is basically on the basis of the above formula and by the material exhibiting a well known X-ray diffraction pattern. A Y-zeolite may contain germanium, gallium, phosphorous or boron in its structure together with or in place of the traditional silica and alumina.

The "acidity" of a zeolite has been the subject of considerable research and conjecture. For instance the impact of acidity on catalytic activity and the relationship of composition and the acid strength of zeolites is discussed in an article by John Dwyer at page 258 of the Apr. 2, 1984 edition of *Chemistry and Industry*. The article states that evidence points to hydroxyls within the zeolite channels as providing the active Bronsted sites. Two types of hydroxyls are described: surface or terminal hydroxyls and bridging hydroxyls in larger pores. The extensive discussion addresses acidity, composition, catalyst activity and catalyst selectivity. It is to be noted that product selectivity is characterized as being determined by pore geometry and size and its impact on diffusion limitations to selective internal sites rather than being determined or influenced by acidity.

In an article by J.M. Newsam in the 7 Mar.1986 edition of *Science* (Vol. 231, pg. 1093) it is stated that most reactions involved in catalytic cracking involve acid sites located within the zeolite. Such Bronsted acidity is mainly attributed to bridging hydroxyl groups. Th acid sites are considered to be localized to or caused by protonated tetrahedral aluminum in the silica rich framework of the zeolite.

As illustrated by the data set out below it has been discovered that the selectivity of a hydrogen form Y- zeolite to produce middle distillate products is directly correlated to the acid strength of the zeolite, which in turn is set by the concentration of hydroxyl groups on the zeolite. It is believed both the use and composition of such a low hydroxyl zeolite hydrocracking catalyst composite are novel.

As it is not presently possible to directly measure the concentration of hydroxyl groups this measurement must be done indirectly. The analytical method of choice is to measure the acidity strength of the zeolite. This is believed to correlate directly to hydroxyl group concentration.

Temperature-programmed desorption of ammonia ($NH_3$-TPD) is widely used and is considered to be an effective procedure for determining the acidity strength of zeolites. (See Hidalgo, C. V. et al., *Measurement of the Acidity of Various Zeolites by Temperature-Programmed Desorption of Ammonia*, J. Catalysis, Vol. 85, No. 2, pp. 362–369 (1984), the teachings of which are incorporated herein by reference.) Ammonia is an excellent probe molecule for the TPD procedure. The molecule's small size allows exceptionally good pore penetration while its strong basicity enables ready stabilization on acid sites. The TPD procedure is preferred because it is relatively simple, consumes a minimum amount of time and can be accurately reproduced.

The $NH_3$-TPD procedure employed herein consists of pretreating a 0.250±0.001 gram sample of zeolite by heating first in air at 500° C. and 60 cc/min flow rate for 75 minutes and then in helium at 500° C. and 60 cc/min flow rate for 15 minutes. The pretreated zeolite is thereafter cooled to room temperature over a period of about 20 minutes under a helium blanket. In order to ensure equilibrium, the zeolite sample is then saturated 5 times with a 10 cc aliquot (atmospheric conditions) of ammonia gas. The saturated zeolite is then purged with helium at room temperature and 60 cc/min flow rate for a period of 35 minutes. Immediately following this period, the gas flow is directed to a gas chromatograph while the sample is heated under a programmed temperature ramp of 8.33° C./min. to a maximum of 650° C. Desorption of ammonia is then monitored by a recorder in the temperature range of 25 to 500° C. over a period of 75 minutes.

The area under the desorption curve produced by the gas chromatograph recorder correlates to the total amount of desorbed ammonia. Analysis of the exit gas by mass spectrometry revealed negligible desorption of impurities in the temperature range of 25° C. to 500° C. To standardize the desorption curve, the ammonia desorbed was trapped in a 10% $H_2SO_4$ solution and quantified by techniques known in the art. The amount of ammonia desorbed per unit area under the desorption curve was determined to be 0.038±0.004 m moles/unit area.

The $NH_3$/TPD acidity strength value was determined by integrating the desorption curve between 25° C. and 500° C. The area under the curve is then multiplied by the factor 0.038 m moles/unit area and divided by the weight of the sample (0.250 g) to obtain the $NH_3$-TPD acidity strength value in units of m mole/g. Thus, for example, if integration between 25° C. and 500° C. gave a total unit area of 10.0 the $NH_3$-TPD acidity strength value would be calculated as 10 unit area×0.038 m mole $NH_3$/unit area/0.250 gram-sample =1.52 m mole/gram sample.

All $NH_3$-TPD acidity strength values contemplated by the present invention possess a unit basis of m mole/gram sample. For simplicity, $NH_3$-TPD values mentioned herein are without unit designation. The reproduction of acidity strength data by $NH_3$-TPD requires exact repetition of key experimental parameters such as rate of temperature increment, sample size, gas flow and equilibrium temperature. Thus, comparison to acidity strengths obtained by different techniques is often difficult. In any event, it is to be understood that acidity strength values contemplated by the present invention include not only those values determined by the $NH_3$-TPD test described above, but also equivalent values which would result from employing alternate techniques for an identical sample.

The Y zeolites suitable for use in the subject process have a (framework) silica to alumina ratio less than 6.0.

The Y-type zeolite contemplated for use in the present invention will possess a unit cell size between about 24.20 Angstroms and 24.45 Angstroms. Preferably, the zeolite unit cell size will be in the range of about 24.20 to 24.40 Angstroms and most preferably about 24.30 Angstroms. It is noted that while the prior art has disclosed that zeolite containing hydrocracking catalysts may be sensitive to modification of the zeolite unit cell size, acidity strength is believed to be independent of this parameter. Decreases in acidity with decreased unit cell size are due to a reduction in the aluminum content of the zeolite, and this effect is not related to different acidity measures of zeolites having equal silica to alumina ratios and/or unit cell sizes.

The Y-type zeolite contemplated by the present invention should possess an $NH_3$-TPD acidity strength value less than about 2.00. It is preferred that the acidity strength value be less than about 1.50, most preferably below about 1.50 and most highly preferred to be in the range of about 0.1 and about 0.70.

The actual route by which a reduced acidity strength hydroge form zeolite Y is obtained is not believed to be critical to the present invention. The contemplated hydrocracking catalyst may accordingly be prepared from any starting material having the essential X-ray powder diffraction pattern of zeolite Y set forth in U.S. Pat. No. 3,130,007. The starting material may be modified by any acidity reduction technique known in the art which provides the desired hydrogen form zeolite. Thus, modification techniques such as hydrothermal treatment at increased temperatures, calcination, impregnation, or reaction with an acidity strength inhibiting specie, crystallization and any combination of these are contemplated.

It is not believed that either the method of modification or manufacture of the zeolite is essential to the present invention. Any hydrogen form zeolite Y material having suitably low hydroxyl group concentration can be utilized as the zeolite component in the present hydrocracking catalyst.

One method of acidity strength reduction is hydrothermal treatment above 500° C. for a period of at least 0.5 hours. A preferred method of acidity reduction is dry air calcination above 500° C. for a period of at least 0.5 hours. A highly preferred method of effecting the desired dehydroxylation is by maintaining the zeolite at a temperature above at least 704° C. for a period of at least one hour in the substantial absence of water. The use of a particular modification technique is not known to be critical to the invention. It is contemplated that two or more different modification techniques could be employed.

The hydrocracking catalyst composite of the present invention should comprise between 2 wt. % and 20 wt. % of the subject Y-type zeolite, and, preferably, between 2 wt. % and 10 wt. %. The present composition also comprises a porous refractory inorganic oxide matrix which may form between 2 and 98 wt. %, and preferably between 5 and 95 wt. % of the support of the finished catalyst composite. The matrix may comprise any known refractory inorganic oxide such as alumina, magnesia, silica, titania, zirconia, silica-alumina and the like and combinations thereof.

A preferred matrix comprises silica-alumina or alumina. The most preferred matrix comprises a mixture of silica-alumina and alumina wherein said silica-alumina comprises between 45 and 90 wt. % of said matrix. It is also preferred that the support comprises from about 5 wt. % to about 45 wt. % alumina.

The silica-alumina component may be produced by any of the numerous techniques which are rather well defined in the prior art relating thereto. Such techniques include the acid-treating of a natural clay or sand, coprecipitation or successive precipitation from hydrosols. These techniques are frequently coupled with one or more activating treatments including hot oil aging, steaming, drying, oxidizing, reducing, calcining, etc. The pore structure of the support or carrier commonly defined in terms of surface area, pore diameter and pore volume, may be developed to specified limits by any suitable means including aging a hydrosol and/or hydrogel under controlled acidic or basic conditions at ambient or elevated temperature, or by gelling the carrier at a critical pH or by treating the carrier with various inorganic or organic reagents.

A finished catalyst, adaptable for utilization in a hydrocracking process, should have a surface area of about 200 to 700 square meters per gram, a pore diameter of about 20 to about 300 Angstroms, a pore volume of about 0.10 to about 0.80 milliliters per gram, and apparent bulk density within the range of from about 0.50 to about 0.90 gram/cc. Surface areas above 350° $m^2/gm$ are greatly preferred.

The alumina component of the catalyst may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. A particularly preferred alumina is referred to as Ziegler alumina and has been characterized in U.S. Pat. Nos. 3,852,190 and 4,012,313 as a by-product from a Ziegler higher alcohol synthesis reaction as described in Ziegler's U.S. Pat. No. 2,892,858. A preferred alumina is presently available from the Conoco Chemical Division of Continental Oil Company under the trademark "Catapal". The material is an extremely high purity alpha-alumina monohydrate (boehmite) which, after calcination at a high temperature, has been shown to yield a high purity gamma-alumina.

It is understood that the precise physical characteristics of the carrier material such as shape and surface area are not considered to be limiting upon the scope of the present invention. The catalyst may, for example, exist in the form of pills, pellets, granules, broken fragments, spheres, or various special shapes such as trilobial extrudates, disposed as a fixed bed within a reaction zone. Alternatively, the catalyst may be prepared in a suitable form for use in moving bed reaction zones in which the hydrocarbon charge stock and catalyst are passed either in countercurrent flow or in co-current flow, or in fluidized-solid processes in which the charge stock is passed upward through a turbulent bed of finely divided catalyst, or in the suspension process, in which the catalyst is slurried in the charge stock and the resulting mixture is conveyed into the reaction zone. The charge stock may be passed through the reactor(s) in the liquid, vapor or mixed phase, and in either upward or downward flow.

The catalyst particles may be prepared by any known method in the art including the well-known oil drop and extrusion methods. In the case of the oil drop method, catalyst particles may be prepared by first suspending the selected zeolite powder in a suitable sol. Active metal components may also be incorporated into the sol. The sol admixture may then be passed as droplets into an oil bath which is maintained at an elevated temperature and retained in the oil bath until the sol droplets set to gelled spheres. Th spherical particles may then be withdrawn from the oil bath and thereafter aged in a suspending medium at an elevated temperature for a suitable time period. The spherical particles may then be dried and calcined. If an alumina or silica-alumina oxide matrix is desired, the oil drop method may be carried out in accordance with U.S. Pat. No. 2,620,314 or 3,003,972, respectively, the teachings of which are incorporated herein by reference.

A preferred method of preparing the catalyst composition of the present invention is to simultaneously comull the selected zeolite with both alumina and amorphous silica-alumina. Prior to mixing, the admixed components are preferably crushed to a powder form. Active metal components may also be incorporated in the admixture at this time. After mulling, the admixture is extruded through a die having suitable openings such as circular or cloverleaf openings to produce an extrudate material of desired shape. The extrudate can be cut in $\frac{1}{8}$ to $\frac{1}{4}$ inch lengths and then dried and calcined at elevated temperatures and conditions known in the art.

Although the hydrogenation components may be added before or during the oil drop or extrusion methods, hydrogenation components are preferably composited with the catalyst by impregnation after the selected zeolite and refractory inorganic oxide materials have been formed, dried and calcined. Impregnation of the metal hydrogenation component into the particles may be carried out in any manner known in the art including evaporative, dip and vacuum impregnation techniques. In general, the dried and calcined particles are contacted with one or more solutions which contain the desired hydrogenation components in dissolved form. After a suitable contact time, the composite particle are dried and calcined to produce finished catalyst particles. Further guidance on the production of suitable catalyst is available from a number of references including U.S. Pat. Nos. 4,588,496 and 4,600,498 which are incorporated herein by reference for their teaching on the preparation and use of hydroprocessing catalysts containing Y zeolites.

Hydrogenation components contemplated are those catalytically active components selected from Group VIB and Group VIII metals and their compounds. Generally, the amount of hydrogenation components present in the final catalyst composition is small compared to the quantity of the other above-mentioned components combined therewith. The Group VIII component generally comprises about 0.1 to about 30% by weight, preferably about 1 to about 15% by weight of the final catalytic composite calculated on an elemental basis.

The Group VIB component comprises about 0.05 to about 30% by weight, preferably about 0.5 to about 15% by weight of the final catalytic composite calculated on an elemental basis. The hydrogenation components contemplated include one or more metals chosen from the group consisting of molybdenum, tungsten, chromium, iron, cobalt, nickel, platinum, palladium, iridium, osmium, rhodium, rudinium and mixtures thereof.

The hydrogenation components will most likely be present in the oxide form after calcination in air and may be converted to the sulfide form if desired by contact at elevated temperatures with a reducing atmosphere comprising hydrogen sulfide, a mercaptan or other sulfur containing compound. The catalyst may be sulfided in situ by contact with a sulfur containing feedstock or it may be sulfided prior to contact with any feedstock by immediately after calcination exposing the composite to a reduced atmosphere.

When desired, a phosphorus component may also be incorporated into the catalyst. Phosphorus incorporation may be effected by either admixing the support materials with a phosphorus-containing compound prior to formation of the particles or including phosphoric acid in the impregnating solution. Usually phosphorus is present in the catalyst in the range of 1 to 30 wt. % and preferably 3 to 15 wt. % calculated as $P_2O_5$.

In addition, boron may also be present in the catalytic composite. Boron may be incorporated into the composite in any elemental or compound form and by any of the above described methods. That is, it may be incorporated during the particle formation step or boron may be present as a compound such as boric acid added to the impregnating solution. Boron may also be incorporated into the framework of the selected zeolites. In the latter instance, a modification of the Y-type zeolite occurs and a silica-alumina-boron-zeolite is formed.

The subject catalysts are especially useful for hydrocracking a hydrocarbon feedstock to a more valuable product of lower average boiling point and lower average molecular weight. The catalysts are especially useful for the production of middle distillate fractions boiling in the range of about 300–700° F. (149–371°0 C.) as determined by the appropriate ASTM test procedure. In addition, the above catalysts are also useful for hydrogenation reactions such as hydrodenitrification and hydrodesulfurization. Typical feedstocks include virtually all heavy mineral and synthetic oils and fractions thereof. Thus, such feedstocks as straight run gas oils, vacuum gas oils, demetallized oils, atmospheric residue, deasphalted vacuum residue, coker distillates, cat cracker distillates, shale oil, tar sand oil, coal liquids, and the like are contemplated. Preferred feedstocks include gas oils having at least 50% volume of their components boiling above 700° F. (371° C.). The hydrocracking feedstock may contain nitrogen usually present as organonitrogen compounds in amounts between 1 ppm and 1.0 wt. %. The feed will normally contain sulfur containing compounds sufficient to provide a sulfur content greater than 0.15 wt. %. It may also contain mono- and/or polynuclear aromatic compounds in amounts of 80 volume percent and higher.

Hydrocracking conditions employed in the subject process are those customarily employed in the art for hydrocracking processes. Hydrocracking reaction temperatures are in the range of 400° to 1200° F. (204–649° C.), preferably between 600° and 950° F. (316–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178–8,888 std. $m^3/m^3$), preferably between 2,000 and 30,000 scf per barrel of charge (355–5,333 std. $m^3/m^3$).

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor.

The subject invention may accordingly be characterized as a hydrocracking process selective for midbarrel distillate production which comprises passing a hydrocarbon feed stream containing at least 50 volume % of components boiling above 371° C. into contact with a catalyst composition comprising in admixture: (i) a hydrogenation component, (ii) a refractory inorganic oxide matrix comprising alumina, and (iii) a crystalline hydrogen form aluminosilicate zeolite having the essential X-ray powder diffraction pattern of zeolite Y, an ionexchange capacity greater than 0.07, a unit cell size between about 24.20 Angstroms and 24.40 Angstroms and a $NH_3$-TPD acidity strength value of less than about 1.50, said zeolite having been subjected to contact with steam at a temperature of 676–780° C. for a period between 2 and 12 hours followed by dehydroxylation by dry calcining at a temperature of at least 426° C. for a period of at least one hour, while maintaining the catalyst at hydrocracking conditions, and recovering a product stream.

The following examples are provided for illustrative purposes and are not intended to limit the scope of the present invention.

EXAMPLE I

In this example the effects of two different techniques for reducing the acidity strength of a zeolite are compared. In Part A, a starting zeolite is heated in the presence of steam followed by a dry calcination while in Part B a starting zeolite is heated in dry air. The acidity strength values of the zeolites were determined by the $NH_3$-TPD test described above. The starting zeolites had framework silica to alumina ratios within the range of 5:1 to 8:1. A framework silica to alumina ratio of about 6:1 is preferred. This ratio is not equivalent to "bulk" silica to alumina ratios sometimes provided in references. The zeolites contained less than 0.1 wt. percent sodium.

Part A

Samples of ammonium exchanged type Y zeolite powder previously sold by Union Carbide Corporation and now sold by UOP and referred to in the literature as LZ-Y82 were employed. The zeolite, having an initial $NH_3$-TPD acidity strength value of 2.60 and a unit cell size of 24.56 Angstroms, were charged to a heating tube provided with an external heating means. Depending upon the acidity strength desired, the zeolite was brought in contact with pure steam generated from demineralized water at a pressure of 14.7 psia (1 atm absolute) and temperatures between 1250 and 1450° F. (676°–788 C.) for a period between 2 and 12 hours. Upon termination of the selected heating period, steam flow was stopped and the temperature of the charge waslowered to ambient room temperature in a stream of dry air during a time period in excess of 4 hours. During this step the zeolite was held at a temperature of at least 800° F. (426° C.) for a period of at least one hour.

Five zeolite samples (A, B, C, D, and F) were prepared in the above manner at the temperature and time parameters indicated in Table I. Analysis of the product samples indicated the characteristic X-ray powder diffraction pattern of zeolite Y and unit cell size and $NH_3$-TPD acidity strength values as indicated in Table I.

The results indicate the acidity of the zeolite may be altered (decreased) to a preselected value while achieving unit cell sizes within the desired range of 24.20 to 24.40. $NH_3$-TPD acidity is therefore adjustable by the procedure of part A which includes a dry air calcination after the steam treatment.

TABLE I

| Zeolite Sample | Steaming Conditions | | Unit Cell Size (A) | Acidity Strength in mole $NH_3$/q |
|---|---|---|---|---|
| | Time (hr) | Temp. °F. (°C.) | | |
| A | 2 | 1250 (676) | 24.36 | 1.50 |
| B | 2 | 1350 (732) | 24.35 | 1.13 |
| C | 2 | 1450 (788) | 24.29 | 0.65 |
| D | 12 | 1450 (788) | 24.25 | 0.14 |
| E | — | — | 24.36 | 1.30 |
| F | 6 | 1250 (676) | 24.35 | 1.25 |

Part B

A sample of a different ammonia exchanged type Y zeolite powder (often referred to as LZ-20, which was previously sold by Union Carbide Corporation and is now sold by UOP) having an $NH_3$-TPD acidity strength value of 2.18 and a unit cell size of 24.37 Angstroms was charged to a muffle furnace (no steam is present in this procedure). This starting material is believed representative of prior art zeolites intended for use in selective midbarrel cracking catalysts which have been steam treated, such as that of the cited U.S. Pat. No. 4,419,271. The zeolite was raised to a temperature of 1300° F. (704° C.), maintained at this temperature for 1 hour, and then allowed to cool to mbient room temperature. Analysis of the product indicated the characteristic X-ray powder diffraction pattern of zeolite Y, a unit cell size of 24.36 Angstroms and an $NH_3$-TPD acidity strength value of 1.30. This zeolite has been labeled sample E in Table I.

The results indicate the dry calcination reduced the $NH_3$-TPD acidity strength of zeolite sample E without a significant effect on unit cell size.

It is noteworthy that in the treatment of Part A both the unit cell size and the $NH_3$-TPD acidity strength values of the starting zeolite were altered. In Part B, however, only the $NH_3$-TPD acidity strength value was reduced while the unit cell size of the starting zeolite remained virtually constant (24.37 Angstroms v. 24.36 Angstroms).

High temperature heating or calcining of the zeolite in a relatively dry environment, e.g. in a flowing nitrogen containing gas without added steam, is thus shown to be an effective method of presumably reducing the hydroxyl group concentration of a zeolite. This technique can therefore be incorporated into a general catalyst preparation method whenever such a low acidity and low hydroxyl group concentration is desired.

Without being limited to theory, it is believed that acidity strength is independent of unit cell size and can be tailored through various combinations of heating in the presence of steam and dry air. The exact effects of heating with and without steam respectively on the acidity strength of a zeolite, however, are not known.

The preferred preparation method results in the production of hydrogen form zeolites having substantially unchanged unit cell sizes relative to the untreated zeolite. The subject dry calcination method is preferably used as the exclusive means of reducing the acidity and hydroxyl group concentration of the zeolite. If other methods are employed, such as dealumination or ion exchange, they are preferably used prior to the subject dry thermal treatment. The dehydroxylation is preferably performed prior to the incorporation of the treated zeolite into the formed catalyst particles.

It is believed that in hydrothermal treatments steam tends to hinder the "dehydroxylation" of the zeolite. Steam apparently is desirable when a change in the unit cell size of the zeolite is desired as an objective of the treatment. The subject method relates to the use of zeolites of reduced hydroxyl concentration rather than to just the use of steam treated zeolites.

Many zeolites used in prior art catalysts are characterized by their adsorptive capacity for water. This characteristic and a test for its determination is described for instance, in previously cited U.S. Pat. No. 4,401,556. The zeolites are characterized in terms of their adsorptive capacity for water vapor at 25° C. and a $p/p_o$ value of 0.10 of less than 5.00 weight percent. Tests for these values were not performed on the test materials of these Examples. However, similarly treated material from the same sources were later tested. Material equivalent to and receiving the same hydrothermal treatment as zeolite C (used below in catalyst 3) had a water adsorptive capacity of about 2.5 wt.%. The untreated Part A starting material (catalyst No. 7) had a water adsorptive capacity of about 18 wt.%. No value is available for the Part B starting material. The water adsorptive capacity appears to decrease proportionally to the intensity of hydrothermal treatment.

EXAMPLE II

The purpose of this Example is to examine the influences of both unit cell size and $NH_3$-TPD acidity strength on the selectivity and activity of finished catalysts.

Catalyst compositions were prepared by mixing a zeolite powder with a refractory oxide matrix admixture of alumina and silica-alumina in amounts selected to yield a catalyst containing 5 weight percent volatile free zeolite and 95 weight percent oxide matrix. The resulting mixture was extruded into approximately 1/16 inch $\times \frac{1}{2}$ inch (0.16$\times$1.27 cm) cylindrical pieces. The extruded material was dried and then air calcined at 650° F. (343° C.) for 2 hours. The calcined particles were then evaporatively coimpregnated with an aqueous solution of ammonia metatungstate and nickel nitrate $(Ni(NO_3)_2.6H_2O)$ present in amounts sufficient to produce a finished catalyst containing 1.0 wt. % elemental nickel and 10.0 wt. % elemental tungsten. The impregnated catalyst was then calcined for 45 minutes at 650° F. (343° C.) and then for 90 minutes at 1100° F. (593° C.). Six catalyst compositions were prepared in the above manner, each containing one of the Y-zeolites prepared in Example I. Table II details the pertinent properties of Catalyst Nos. 1-6, which comprise zeolites A through F respectively.

Catalysts were prepared in the above described manner with the starting zeolite materials utilized in Parts A and B of Example 1. Catalyst No. 7 was prepared with the starting zeolite in Part A (unit cell size =24.56 Angstroms, NH₃-TPD =2.60) and Catalyst No. 8 was prepared with the starting zeolite in Part B (unit cell size =24.37 Angstroms, NH₃-TPD =2.18). The pertinent properties of Catalyst Nos. 7 and 8 are also given in Table II.

TABLE II

| Catalyst No. | Zeolite | Unit Cell Size | NH$_3$—TPD Value |
|---|---|---|---|
| 1 | A | 24.36 | 1.50 |
| 2 | B | 24.35 | 1.13 |
| 3 | C | 24.29 | 0.65 |
| 4 | D | 24.25 | 0.14 |
| 5 | E | 24.36 | 1.30 |
| 6 | F | 24.35 | 1.25 |
| 7 | Part A starting matl. | 24.56 | 2.60 |
| 8 | Part B starting matl. | 24.37 | 2.18 |

Each of the foregoing catalysts was tested for activity and selectivity according to the following method. A preheated vacuum gas oil having the chemical and physical properties shown in Table III was passed on a once-through basis through an isothermal reactor containing 75 cc of catalyst particles mixed with about 29 cc of 60 to 80 mesh quartz. The operating parameters were 2000 psig (13,790 kPa g), 1.0 LHSV, a hydrogen recycle flow of 10,000 scf/bbl (1,778 std. m³/m³) with 90-95% purity and a run length of approximately 4 days. The reactor temperature was adjusted to provide 85 wt. % conversion to products boiling below 700° F. (371° C.). The conversion percent is calculated from a liquid chromatograph boiling range analysis of the product.

TABLE III

| Vacuum Gas Oil Properties | | | |
|---|---|---|---|
| Specific Gravity @ 15.6° C. | 0.9248 | Distillation, °C. | |
| Gravity °API @ 15.6° C. | 21.5 | IPB | 280 |
| Pour Point, °C. | 26.7 | 5/10% | 340/372 |
| Analine Point, °C. | 75.0 | 20/30 | 398/419 |
| Sulfur (LECO), wt. % | 2.24 | 40/50 | 439/455 |
| Nitrogen (Kjeldahl), ppm | 1100 | 60/70 | 473/490 |
| Carbon, wt. % | 85.82 | 80/90 | 514/544 |
| Hydrogen, wt. % | 11.64 | EP | 582 |
| Bromine No. | 5.0 | % Rec. | 99.0 |
| Viscosity, @ 98.9° C., CST | 6.954 | | |
| Conradson Carbon, wt. % | 0.42 | | |

The results of the above test are compiled in Table IV. Catalysts 1-4 and 6 are derived from the material of Part A of Example I. The data for these five catalysts shows that at lower unit cell sizes of the zeolite: (1) the activity of the catalyst decreases and (2) the selectivity increases.

TABLE IV

| Catalyst No. | Activity, °F. (°C.) (Reactor Temp. to provide 85% conversion) | Selectivity (weight % 300-700° F. Product at 85 wt. % conversion) | NH$_3$—TPD value |
|---|---|---|---|
| 1 | 774 (412) | 59 | 1.50 |
| 2 | 778 (414) | 59 | 1.13 |
| 3 | 786 (419) | 61 | 0.65 |
| 4 | 797 (425) | 63 | 0.14 |
| 5 | 782 (417) | 60 | 1.30 |
| 6 | 782 (417) | 59 | 1.25 |
| 7 | 761 (405) | 55 | 2.60 |
| 8 | 782 (417) | 56 | 2.18 |

The data also reveals that Catalyst Nos. 1 through 6 of the present invention are far superior in terms of overall combined activity and selectivity than Catalyst Nos. 7 and 8 containing the untreated high acidity catalyst. A comparison of Catalyst Nos. 1-6 and Nos. 7 and 8 shows that a superior catalyst results when the NH₃-TPD acidity strength value of the zeolite component is less than about 2.00. More specifically, even though Catalyst No. 7 exhibits a relatively high activity (761° F./405° C.), selectivity is unacceptable (55 wt. %). It is to be noted, however, that the unit cell size of the zeolite contained in Catalyst No. 7 is 24.56 Angstroms which is outside the preferred range of 24.20 to 24.45 Angstroms of the previously cited U.S. Pat. No. 4,401,556.

Catalyst No. 8, however, which is within this range with a zeolite unit cell size of 24.37 Angstroms, exhibits comparable activity (782° F./417° C.), but poor selectivity (56 wt. %). From the above examples, it is evident that the NH₃-TPD acidity strength of a zeolite component affects the overall performance of a hydrocracking catalyst.

The zeolite starting material of Part B is, as previously stated, apparently within many preferences of the zeolites described in previously cited prior art reference U.S. Pat. No. 4,401,556 to Bezman et al. This is a commercially available material having a unit cell size of 24.37 A which has been subjected to hydrothermal treatment. One exception to the zeolite of the subject invention fitting within the preferences of the cited reference is an ion-exchange capacity, determined as per the Bezman et al. reference, of 0.171. This material was used in catalyst 8. The Bezman reference teaches the ionexchange capacity should not be greater than 0.07.

The subject dry calcination converts the material used in catalyst 8 to the material used to prepare catalyst 5. Catalyst 5 has better selectivity at the same activity and is a superior catalyst. However, the difference in unit cell sizes of the zeolites of catalysts 5 and 8 is almost insignificant. Therefore the subject method improves the selectivity of the catalyst by a factor much greater than would be predicted by the change in unit cell size. The zeolite E used in the superior catalyst 5 had an ion-exchange capacity of 0.091. This exceeds the stated upper limit of the Bezman et al. reference by 28 percent.

Although the invention has been described in conjunction with several specific examples, variations and modifications apparent to those skilled in the art are intended to be encompassed within the spirit and scope of the appended claims.

What is claimed:

1. In a hydrocraking process for the production of middle distillates having boiling points of 149°–371° C. in which a hydrocarbon feed stream is passed into contact with a catalyst composition comprising a refractory inorganic oxide matrix and a hydrogen form zeolite having the characteristic X-ray powder diffraction pattern of zeolite Y, with the zeolite having a unit cell size between about 24.2 and 24.40 Angstroms, at hydrocracking conditions and a product stream is recovered; the improvement which comprises employing as said zeolite a low acidity zeolite having an ion exchange capacity greater than 0.07, and a bound hydroxyl content sufficiently low to provide an Ammonia temperature programmed desorption ($NH_3$-TPD) acidity strength value of less than about 2.00.

2. The process of claim 1 wherein said zeolite has a bound hydroxyl concentration which results in an Ammonia temperatureprogrammed desorption ($NH_3$-TPD acidity strength value of less than about 1.50.

3. The process of claim 1 wherein prior to incorporation into the catalyst said zeolite is maintained at a temperature above at least 704° C. for a period of one hour in the substantial absence of water.

4. The process of claim 3 wherein said matrix comprises between 45 wt. % and 90 wt. % silica-alumina.

5. The process of claim 4 wherein said composition comprises between 2 wt. % and 20 wt. % of said zeolite.

6. The process of claim 5 wherein said catalyst comprises between 5 and 45 wt.% alumina.

7. The process of claim 6 wherein said composite comprises a Group VIB metal component and a Group VIII metal component.

8. The process of claim 7 wherein the Group VIB component is selected from the group consisting of molybdenum, tungsten and compounds thereof and the Group VIII metal component is selected from the group consisting of nickel, cobalt and compounds thereof.

9. A hydrocracking process selective for midbarrel distillate production which comprises passing a hydrocarbon feed stream containing at least 50 volume % of components boiling above 371° C. into contact with a catalyst composition comprising in admixture: (i) a hydrogenation component, (ii) a refractory inorganic oxide matrix comprising alumina, and (iii) a crystalline hydrogen form aluminosilicate y zeolite having a unit cell size between about 24.20 Angstroms and 24.40 Angstroms, an ion exchange capacity greater than 0.07 and an Ammonia temperature programmed desorption ( $NH_3$-TPD acidity strength value of less than about 1.50 while maintaining the catalyst at hydrocracking conditions, and recovering a product stream.

10. The process of claim 9 wherein said zeolite has a unit cell size between 24.25 and 24.35.

11. The process of claim 9 wherein said zeolite has a unit cell size of about 24.30 Angstroms.

12. The process of claim 9 wherein said composition comprises between 2 wt.% and 20 wt. % of said zeolite.

13. The process of claim 12 wherein said refractory inorganic oxide matrix comprises an admixture of alumina and silica-alumina.

14. The process of claim 13 wherein said matrix comprises between 45 wt. % and 90 wt. % silica-alumina and also comprises between 5 and 45 wt. % alumina.

15. The process of claim 9 wherein said hydrogenation component is selected from Group VIB metals, Group VIII metals and combinations thereof.

16. The process of claim 15 wherein the Group VIB component is selected from the group consisting of molybdenum, tungsten and compounds thereof and the Group VIII metal component is selected from the group consisting of nickel, cobalt, and compounds thereof.

17. A hydrocracking process selective for midbarrel distallate production which comprises passing a hydrocarbon feed stream containing at least 50 volume % of components boiling above 371° C. into contact with a catalyst composition comprising in admixture: (i) a hydrogenation component, (ii) a refractory inorganic oxide matrix comprising alumina, and (iii) a crystalline hydrogen form aluminosilicate zeolite having the essential X-ray powder diffraction pattern of zeolite Y, an ionexchange capacity greater than 0.07, a unit cell size between about 24.20 Angstroms and 24.40 Angstroms and a Ammonia temperature programmed desorption ($NH_3$-TPD)acidity strength value of less than 1.50, said zeolite having been subjected to contact with steam at a temperature of 676–780° C. for a period between 2 and 12 hours followed by denydroxylation by dry calcining at a temperature of at least 426° C. for a period of at least one hour, while maintaining the catalyst at hydrocracking conditions, and recovering a product stream.

18. The process of claim 17 wherein the hydrogenation component is chosen from the group consisting of nickel, platinum and molybdenum.

19. The process of claim 18 wherein the zeolite has a unit cell size of 24.25 to 24.35 Angstroms after dehydroxylation.

* * * * *